J. S. BARNES.
VARIABLE SPEED GEARING.
APPLICATION FILED OCT. 30, 1911.

1,024,818.

Patented Apr. 30, 1912.

2 SHEETS—SHEET 1.

Witnesses:
W. L. Dow
E. Behel.

Inventor:
John S. Barnes
By A. O. Behel
Atty.

J. S. BARNES.
VARIABLE SPEED GEARING.
APPLICATION FILED OCT. 30, 1911.

1,024,818.

Patented Apr. 30, 1912.

2 SHEETS—SHEET 2.

Witnesses:
W. L. Dow.
E. Behel.

Inventor:
John S. Barnes
By A. O. Behel
Atty

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED GEARING.

1,024,818.   Specification of Letters Patent.   Patented Apr. 30, 1912.

Application filed October 30, 1911. Serial No. 657,670.

*To all whom it may concern:*

Be it known that I, JOHN S. BARNES, a citizen of the United States, residing at Rockford, in the county of Winnebago and State of Illinois, have invented certain new and useful Improvements in Variable-Speed Gearing, of which the following is a specification.

The object of this invention is to construct a very simple gearing in which the greatest number of speeds can be obtained with the given number of gears.

Figure 1:
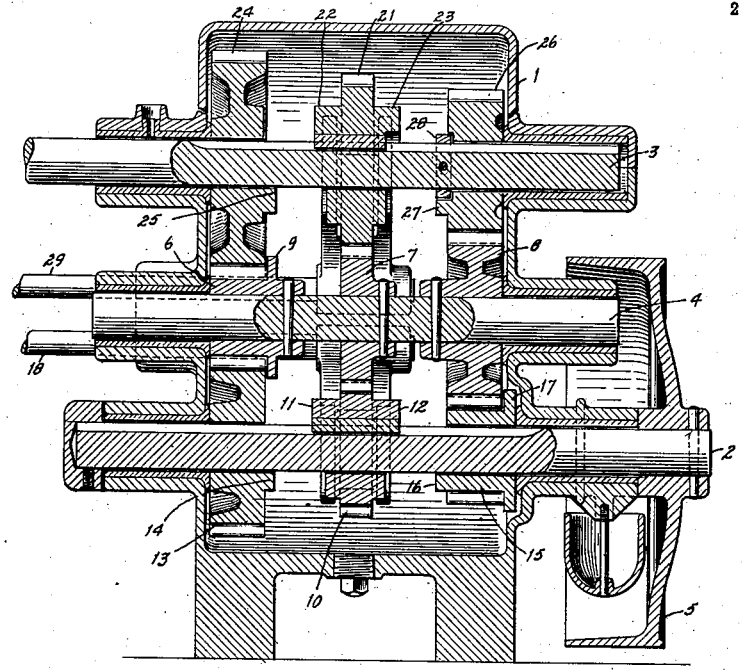
Figure 2:
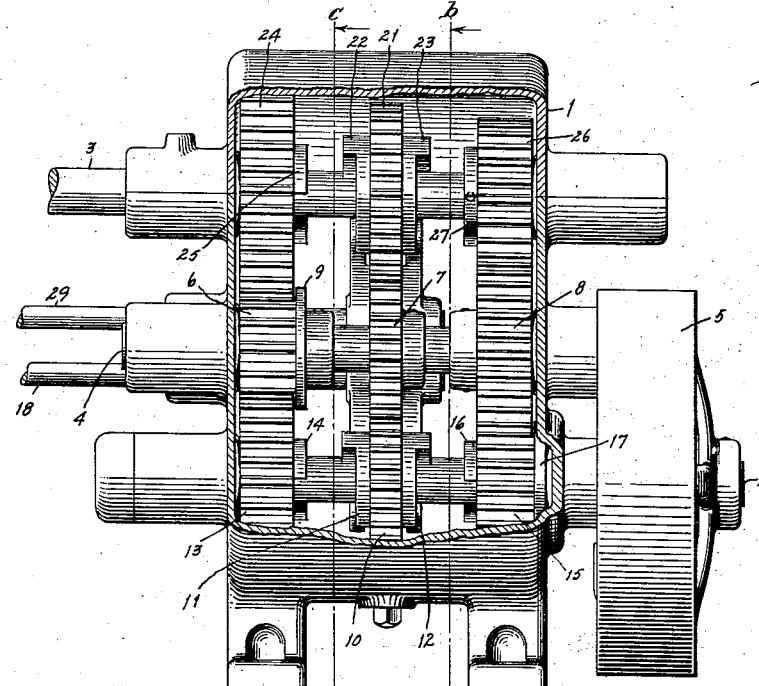
Figure 3:
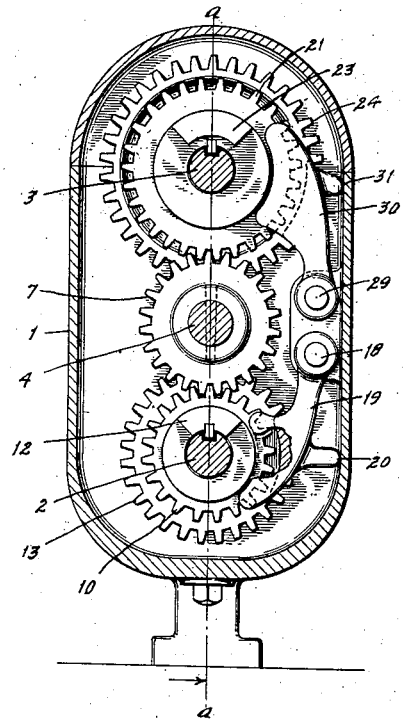
Figure 5:
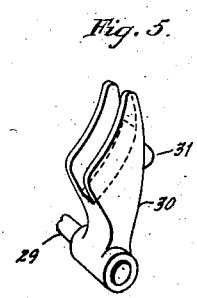
Figure 4:
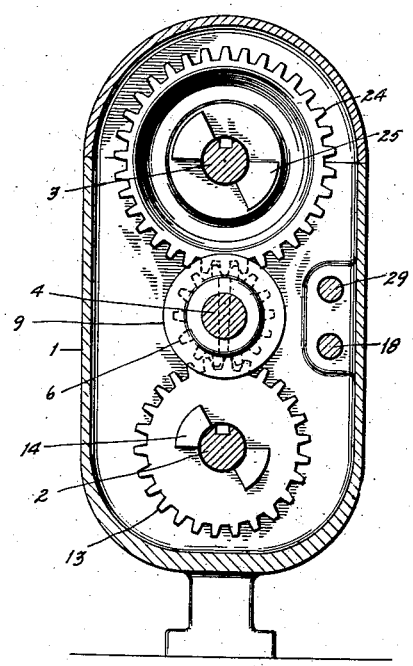

In the accompanying drawings, Fig. 1 is a section on line $a\ a$ Fig. 3. Fig. 2 is an elevation in which the casing is broken away. Fig. 3 is a section on line $b\ b$ Fig. 2. Fig. 4 is a section on line $c\ c$ Fig. 2. Fig. 5 is a perspective view of one of the shipping yokes.

The casing 1 supports bearings for the driving shaft 2, driven shaft 3 and intermediate shaft 4. The driving shaft 2 is rotated by a belt connection with the pulley 5 connecting it with a prime mover. The intermediate shaft 4 has three spur-gears 6, 7 and 8 pinned thereto, and the gear 6 has a flange 9. The driving shaft 2 has a spur-gear 10 slidably engaging it, and has its faces formed with the clutch members 11 and 12. A spur-gear 13 is loosely mounted on the driving-shaft 2 and is provided with a clutch face 14 and is held against sliding on the shaft 2 by the flange 9 of the spur-gear 6 engaging it. This spur-gear 13 meshes with the spur-gear 6. A spur-gear 15 is loosely mounted on the driving-shaft 2, and is provided with a clutch face 16, also with a flange 17. This spur-gear is held against a sliding movement on the driving-shaft by the flange 17 engaging the spur-gear 8. The spur-gear 15 meshes with the spur-gear 8.

A rod 18 is supported in the casing and to it is connected a shipping-yoke 19 which engages both faces of the sliding-gear 10, and has a projection 20 which contacts with the casing 1. By means of this rod and yoke, the gear 10 can be held in mesh with the gear 7 can be disengaged therefrom and its clutch face 11 moved into engagement with the clutch face 14 of the gear 13, or its clutch face 12 moved into engagement with the clutch face 16 of the gear 15.

To the driven shaft 3 is slidably connected a spur-gear 21 having clutch faces 22 and 23. A spur-gear 24 is loosely mounted on the driven-shaft and has a clutch face 25. This gear is held from a sliding movement on the shaft 3 by the flange 9 of the gear 6 engaging it. A spur-gear 26 is loosely mounted on the driven-shaft and has a clutch face 27. A collar 28 is pinned to the driven shaft and holds the gear 26 from sliding on the shaft. The gear 21 can be disengaged from the gear 7 and its clutch face 22 moved into engagement with the clutch face 25 of the gear 24, or its clutch face 23 moved into engagement with the clutch face 27 of the gear 26.

A rod 29 is supported by the casing and to it is connected a shipping-yoke 30, which engages both faces of the sliding gear 21 and has a projection 31 which contacts with the casing. By means of this rod and yoke, the gear 21 can be moved as above set forth.

By the employment of the two sliding gears 10 and 21, and the various clutch connections nine speeds can be given to the driven-shaft from the driving-shaft.

I claim as my invention.

A variable speed gearing comprising a driving-shaft, a driven-shaft, an intermediate-shaft, three spur-gears fixedly connected to the intermediate-shaft, a spur-gear slidably mounted on the driving-shaft and provided with clutch members on both faces, two spur-gears loosely mounted on the driving-shaft, and each provided with a clutch face, means for moving the clutch members of the slidable gear on the driving-shaft into engagement with either of the clutch faces of the gears loosely mounted thereon, a spur-gear slidably mounted on the driven-shaft and provided with clutch members on both faces, two spur-gears loosely mounted on the driven shaft and each provided with a clutch face, and means for moving the clutch members of the slidable-gear on the driven-shaft into engagement with either of the clutch faces of the gears loosely mounted thereon.

In testimony whereof I have hereunto set my hand in presence of two subscribing witnesses.

JOHN S. BARNES.

Witnesses:
ELIZA J. BRYDEN,
A. O. BEHEL.

Copies of this patent may be obtained for five cents each, by addressing the "Commissioner of Patents, Washington, D. C."